United States Patent
Dube et al.

(10) Patent No.: US 10,116,744 B2
(45) Date of Patent: Oct. 30, 2018

(54) SYSTEM AND METHOD FOR PROVIDING MANAGEMENT NETWORK COMMUNICATION AND CONTROL IN A DATA CENTER

(71) Applicant: Dell Products, LP, Round Rock, TX (US)

(72) Inventors: Shawn J. Dube, Austin, TX (US); Sajjad Ahmed, Round Rock, TX (US); Sudhir V. Shetty, Cedar Park, TX (US); John R. Palmer, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 185 days.

(21) Appl. No.: 15/015,961

(22) Filed: Feb. 4, 2016

(65) Prior Publication Data
US 2017/0230251 A1 Aug. 10, 2017

(51) Int. Cl.
*H04L 12/24* (2006.01)
*H04L 29/08* (2006.01)

(52) U.S. Cl.
CPC ........ *H04L 67/1097* (2013.01); *H04L 41/042* (2013.01)

(58) Field of Classification Search
CPC ............................ H04L 41/12; H04L 67/1097
USPC ...................................................... 709/223
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersgard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |
| 6,131,119 A | 10/2000 | Fukui |
| 6,167,448 A | 12/2000 | Hemphill et al. |
| 6,282,175 B1 | 8/2001 | Steele et al. |
| 6,601,084 B1 | 7/2003 | Bhaskaran et al. |
| 6,654,347 B1 | 11/2003 | Wiedeman et al. |
| 6,714,977 B1 | 3/2004 | Fowler et al. |

(Continued)

*Primary Examiner* — Adnan Mirza
(74) *Attorney, Agent, or Firm* — Larson Newman, LLP (57) ABSTRACT

An information handling system includes a host processing complex to instantiate a hosted processing environment, a managed element, and a management controller to manage the managed element out of band from the hosted processing environment. The management controller stores console information from a management console, where the management console directs the management controller to manage the managed element, and the management controller provides the console information to a mobile management device, where the mobile management device directs the management console to direct the management controller to manage the managed element based upon the console information.

19 Claims, 6 Drawing Sheets

(56) References Cited

U.S. PATENT DOCUMENTS

| | | |
|---|---|---|
| 6,826,714 B2 | 11/2004 | Coffey et al. |
| 7,450,636 B2 | 11/2008 | Lee et al. |
| 7,696,506 B2 | 4/2010 | Lung |
| 7,720,987 B2 | 5/2010 | Penk et al. |
| 8,031,763 B2 | 10/2011 | Sumesaglam |
| 8,037,330 B2 | 10/2011 | Livescu et al. |
| 8,588,288 B2 | 11/2013 | Witt |
| 8,732,508 B2 | 5/2014 | Cochran et al. |
| 2002/0095487 A1 | 7/2002 | Day et al. |
| 2002/0141210 A1 | 10/2002 | Glannopoulos et al. |
| 2003/0046339 A1 | 3/2003 | Ip |
| 2004/0010649 A1 | 1/2004 | Weaver et al. |
| 2004/0013188 A1 | 1/2004 | Tonietto et al. |
| 2006/0182172 A1 | 8/2006 | Lin |
| 2007/0094426 A1 | 4/2007 | Chiang et al. |
| 2008/0304557 A1 | 12/2008 | Hollis |
| 2008/0317021 A1 | 12/2008 | Ives et al. |
| 2009/0189774 A1 | 7/2009 | Brundridge et al. |
| 2009/0217073 A1 | 8/2009 | Brech et al. |
| 2009/0307515 A1 | 12/2009 | Bandholz et al. |
| 2010/0027687 A1 | 2/2010 | De Natale et al. |
| 2010/0106154 A1 | 4/2010 | Harlev et al. |
| 2011/0022245 A1 | 7/2011 | Goodrum et al. |
| 2011/0179301 A1 | 7/2011 | Liu et al. |
| 2012/0170638 A1 | 7/2012 | Chen |
| 2012/0262956 A1 | 10/2012 | DeHaven |
| 2012/0303767 A1 | 11/2012 | Renzin |
| 2012/0317256 A1* | 12/2012 | Gadbois ............... H04L 67/125 709/223 |
| 2013/0007249 A1 | 1/2013 | Wang et al. |
| 2013/0169314 A1 | 7/2013 | Choudhary et al. |
| 2014/0269881 A1 | 9/2014 | He et al. |
| 2014/0312953 A1 | 10/2014 | Song |

\* cited by examiner

| Console Type | Most Recent Address |
| --- | --- |
| Data Center Power | 123.223.345.001 |
| Server | 123.223.345.011 |
| Workload | 123.233.345.021 |
| Lifecycle | 123.223.345.031 |

210

| Console | Address | UID/Credential |
| --- | --- | --- |
| Data Center Power | 123.223.345.001 | Admin/Admin |
| Server #1 | 123.223.345.011 | Google/ServerAdmin |
| Server #2 | 123.223.345.012 | Facebook/Facebook |
| Workload #1 | 123.233.345.021 | Google/WorkloadAdmin |
| Workload #2 | 123.233.345.022 | Facebook/Facebook |
| Lifecycle | 123.223.345.031 | N/A |

SYSTEM AND METHOD FOR PROVIDING MANAGEMENT NETWORK COMMUNICATION AND CONTROL IN A DATA CENTER

FIELD OF THE DISCLOSURE

This disclosure generally relates to information handling systems, and more particularly relates to a system and method for providing management network communication and control in a data center.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a host processing complex to instantiate a hosted processing environment, a managed element, and a management controller to manage the managed element out of band from the hosted processing environment. The management controller stores console information from a management console, where the management console directs the management controller to manage the managed element, and the management controller provides the console information to a mobile management device, where the mobile management device directs the management console to direct the management controller to manage the managed element based upon the console information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
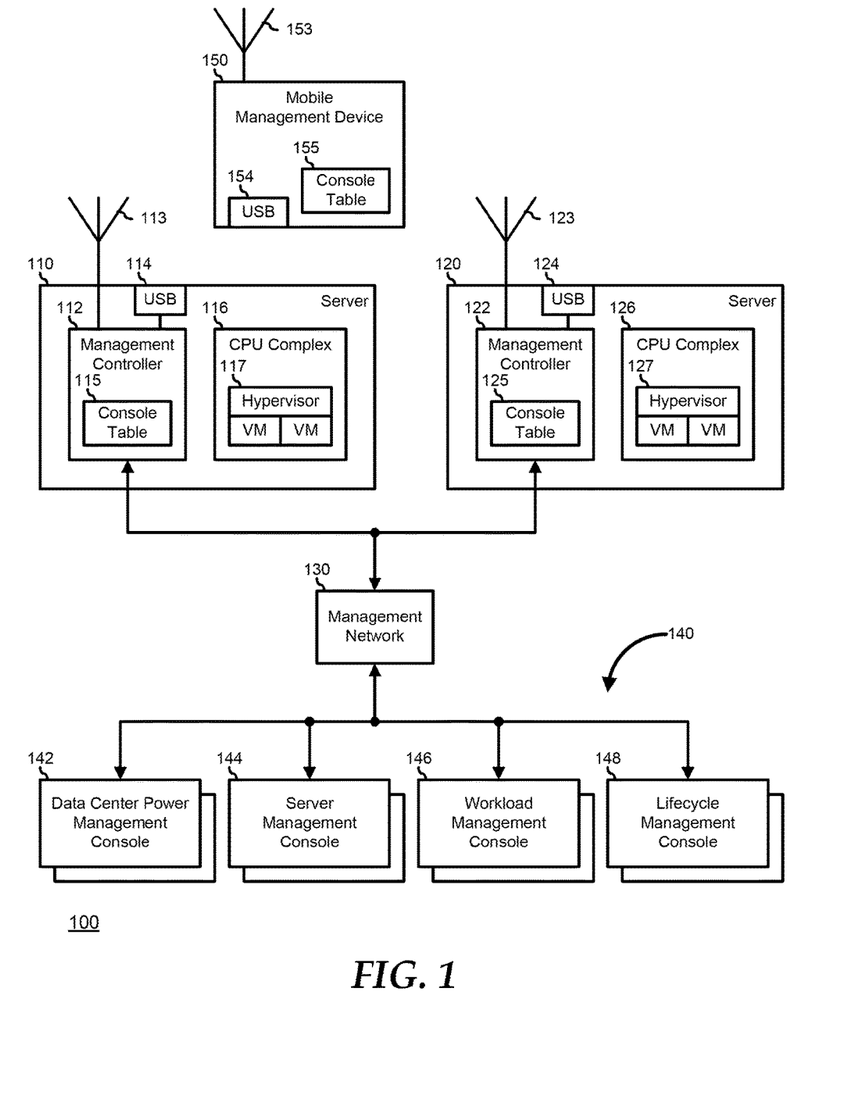
FIG. 1 is a block diagram of a data center according to an embodiment of the present disclosure.

FIG. 1 illustrates an embodiment of a data center 100. For the purpose of this disclosure a data center can be implemented as one or more information handling system that can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Data center 100 includes a server 110, one or more additional server 120, a management network 130, a management system 140, and a mobile management device 150. Data center 100 represents a group of networked information handling systems that are employed by an organization for processing, storing, and distributing data. Servers 110 and 120 are information handling systems configured to provide the processing, storing, and distributing functions of data center 100. As such, servers 110 and 120 are connected to one or more data networks (not shown) that connect the servers to each other and to resources outside of data center 100, such as via the Internet, a private internet, or another network, as needed or desired. Servers 110 and 120 are also connected to via management network 130 to management system 140. Mobile management device 150 operates to connect to one or more of servers 110 and 120 and to access functions and features of management system 140.

Server 110 includes a management controller 112 and a CPU complex 116. CPU complex 116 represents the core processing functionality of server 100 to provide for processing, storing, and distributing data. CPU complex 116 includes hardware elements such as one or more central processing units (CPUs), input/output devices, storage devices, volatile and non-volatile memory, and the like. CPU complex 116 instantiates a hosted environment that performs the processing, storing, and distributing of data. In a particular embodiment, CPU complex 116 operates to launch an operating system that provides the hosted environment. In another embodiment, CPU complex 116 operates to launch a hypervisor 117, also called a virtual machine manager, that provides a virtualized hosted environment and that instantiates and manages one or more virtual machine that each performs various data processing, storing, and distributing tasks. The various tasks are determined and managed based upon a workload that is assigned to the virtual machines, as needed or desired.

Management controller 112 is connected to management network 130 to provide for out-of-band monitoring, management, and control of the elements of server 110. For example, management controller 112 can provide system monitoring functions, such as temperature monitoring, power supply monitoring, physical intrusion monitoring, hot-swap and hot-plug monitoring, other monitoring functions that can be performed outside of a hosted environment of server 110, or other system monitoring functions as needed or desired. Management controller 112 can also provide system management and control functions for the elements of server 110, such as cooling fan speed control, power supply management, hot-swap and hot-plug management, firmware management and update management for system BIOS or UEFI, Option ROM, device firmware, and the like, or other system management and control functions as needed or desired. As such, management controllers 112 represents embedded controller hardware of server 110 that operates separately from the hosted processing environment of the server For example, management controller 112 can include a baseboard management controller (BMC), an Integrated Dell Remote Access Controller (IDRAC), or another type of management controller as needed or desired. Further, management controller 112 can operate in accordance with an Intelligent Platform Management Interface (IPMI) specification, a Web Services Management (WS-MAN) standard, or another interface standard for embedded management systems, as needed or desired. The skilled artisan will recognize that management controller 112 can include other circuit elements, devices, or sub-systems, such as an embedded controller, a logic device such as a Programmable Array Logic (PAL) device, a Complex Programmable Logic Device (CPLD), a Field-Programmable Gate Array (FPGA) device, or the like, multiplexors, and other devices as needed or desired to provide the functions and features as described herein.

Management controller 112 includes a wireless interface 113 and a Universal Serial Bus (USB) interface 114. Management controller 112 further operates to provide connectivity between the management controller and mobile management device 150 and that permit a user of the mobile management device to access the monitoring and management functions of the management controller, and to access management system 140, as described further, below. For example, mobile management device 150 includes a wireless interface 153 and a USB interface 154, and the management controller 112 can establish a wireless connection to mobile management device 150 via wireless interfaces 113 and 153, or can establish a wired connection to the mobile management device via USB interfaces 114 and 154. Wireless interfaces 113 and 153 represent WiFi wireless communication interfaces in accordance with one or more IEEE 802.11 specification for high-speed data communication, Bluetooth wireless communication interfaces in accordance with one or more Bluetooth specifications, including Bluetooth Low Energy (BLE), also known as Bluetooth Smart (BTS), for lower-speed communications, or other wireless communication interfaces, as needed or desired. USB interfaces 114 and 154 represent wired communication interfaces in accordance with a USB 3.1 standard. Management controller 112 can include additional wired interfaces, including a wired interface in accordance with an IEEE 1394 specification, a Serial ATA specification, or another wired interface, as needed or desired.

Management controller 112 includes various security features to ensure that the connection between the management controller and mobile management device 150 is secure and that the user of the mobile management device is authorized to access the resources of the management controller and management system 140. In particular, management controller 112 provides various WiFi user and device authentication schemes, such as schemes that are in accordance with one or more IEEE 802.11 specifications, Service Set Identification (SSID) hiding, Media Access Control Identification (MAC ID) filtering to allow only pre-approved devices or to disallow predetermined blacklisted devices, Static Internet Protocol (IP) addressing, Wired Equivalent Privacy (WEP) encryption, WiFi Protected Access (WPA) or WPA2 encryption, Temporary Key Integrity Protocol (TKIP) key mixing, Extensible Authentication Protocol (EAP) authentication services, EAP variants such as Lightweight-EAP (LEAP), Protected-EAP (PEAP), and other standard or vendor specific user and device authentication schemes, as needed or desired. Further, management controller 112 provides various Bluetooth device and service authentication schemes, such as a Security Mode 2 service level-enforced security mode that may be initiated after link establishment but before logical channel establishment, a Security Mode 3 link level-enforced security mode that may be initiated before a physical link is fully established, a Security Mode 4 service level-enforced security mode that may be initiated after link establishment but before logical channel establishment and that uses a Secure Simple Pairing (SSP) protocol, or other device or service authentication schemes, as needed or desired.

In a particular embodiment, management controller 112 also provides additional security features that further assure the user, device, and service security of the connection between the management controller and mobile management device 150. For example, management controller 112 can include an activation switch that operates to enable the establishment of the connection between the management controller and the mobile management device. In this way, the establishment of the connection between management controller 112 and mobile management device 150 is predicated on the physical proximity of a user and of the user's mobile management device to server 110, and also upon an action indicating a request to establish the connection. Here, a remote device and user would not be able to initiate an attack on data center 100 because of the lack of physical proximity to server 110 to activate the activation switch, and so any attempt to attack the data center would have to wait at least until a service technician activates the activation switch.

Mobile management device 150 represents a wireless communication enabled device, such as a tablet device, a laptop computer, a smart phone, and the like, that is configured to interact with management controller 110 via a wireless connection or a USB connection. In particular, mobile management device 150 can include a mobile operating system (OS), such as an Android OS, an iOS, a Windows mobile OS, or another mobile OS that is configured to operate with the hardware of the mobile device. As such, the hardware of mobile management device 150 can include Android-enabled hardware, iOS-enabled hardware, Windows-enabled hardware, or other hardware, as needed or desired.

Server 120 is similar to server 110, and includes a management controller 122 similar to management controller 112 and a CPU complex 126 similar to CPU complex. As such, management controller 122 includes a wireless interface 123 similar to wireless interface 113 and a USB interface 124 similar to USB interface 114, and CPU complex 126 includes hardware elements and instantiates a hosted environment that performs the processing, storing, and distributing of data. Management controller 122 is connected to management network 130 to provide for out-of-band monitoring, management, and control of the elements of server 120, and represents embedded controller hardware of the server.

Management network 130 represents a network fabric that provides for the routing and forwarding of management traffic between management controllers 112 and 122 to management system 140. In a particular embodiment, management network 130 is a fabric that is dedicated to the communication of the management traffic, and that is isolated from a network fabric for the data processing, storing, and distributing functions of data center 100. In another embodiment, management network 130 is superimposed on a network fabric of data center 100 that also provides the data processing, storing, and distributing functions of the data center. In either embodiment, one or more element of management system 140, as described below, can establish a virtual private network (VPN) with one or more of servers 110 and 120 in order to secure the management traffic.

Management system 140 broadly represents various functions and features for managing data center 100 and the various elements thereof. In particular, management system 140 includes one or more data center power management console (hereinafter power console) 142, one or more server management console (hereinafter server console) 144, one or more workload management console (hereinafter workload console) 146, and one or more lifecycle management console (hereinafter lifecycle console) 148. Power console 142 represents a management console that permits a data center administrator to monitor and control various functions and features of the data center that are related to power consumption and power management. For example, power console 142 can permit the administrator to manage the physical infrastructure of data center 100, such as lighting, heating-ventilation-and-air-conditioning (HVAC), site access authentication and physical security, power distribution, back-up power systems, and the like. Power console 142 can also permit the administrator to manage power to servers 110 and 120, and to other elements of data center 100, such as to power up or power down the elements of the data center, to direct the elements into a low-power mode, or the like. Typically, a single power console 142 will be operated in data center 100. However, where particular functions of data center 100 are desired to be managed separately, one or more additional power consoles can be implemented in the data center. For example, where a particular set of elements of data center 100 are under a higher level of restricted access, a separate power console can be provided to monitor and control the more restricted elements. In another embodiment, a particular element of data center 100 can be managed by multiple power consoles, as needed or desired.

Server console 144 represents a management console that permits the administrator to monitor and control various functions and features of data center 100 that relate to servers 110 and 120, and the other elements of the data center. For example, server console 144 can permit the administrator to monitor server utilization within data center 100 and can direct servers to be powered up to bring more capacity on line when the data processing, storing, and distributing loads are increase or to be powered down to reduce the capacity when the loads are decreased. In this capacity, server console 144 can function independently from power console 142, or in conjunction with the power console, to power up or power down servers 110 and 120. Server console 144 can also permit the administrator to monitor and manage the operations within servers 110 and 120, such as to allocate the resources of the servers. For example, server console 133 can permit the administrator to reallocate storage capacity of a storage area network (SAN) or a network attached storage (NAS) to one or more of servers 110 and 120. In addition, where one or more of servers 110 and 120 provide virtualized hosted environments, server console 144 can permit the administrator to direct hypervisors 117 and 127 to instantiate new virtual machines, to migrate virtual machines, and to extinguish existing virtual machines. In a particular embodiment, more than one server console is instantiated in data center 100. For example, where data center 100 serves separate and distinct customers, each customer can have dedicated resources that are managed by a separate server console. In another embodiment, one or more of server 110 and 120 can be managed by multiple server consoles, as needed or desired.

Workload manager 146 represents a management console that permits the administrator to monitor and control various functions and features of data center 100 that relate to the workloads running on servers 110 and 120, and the other elements of the data center. For example, workload console 146 can permit the administrator to launch one or more workload on a particular server or virtual machine, migrate a workload to a new server or virtual machine, or extinguish a workload from a server or virtual machine. In this capacity, workload console 146 can function independently from server console 144, or in conjunction with the server console, to manage the workloads in data center 100. In a particular embodiment, more than one workload console is instantiated in data center 100. For example, in the case where data center 100 serves separate and distinct customers, each customer can have dedicated workloads that are managed by a separate workload console. In another embodiment, one or more of server 110 and 120 and the instantiated virtual machines can be managed by multiple workload consoles, as needed or desired.

Lifecycle console 148 represents a management console that permits the administrator to monitor and control various functions and features of data center 100 that relate to upgrading, maintaining, and replacing servers 110 and 120, the other elements of the data center, or devices and components thereof. For example, lifecycle console 148 can permit the administrator to update a BIOS or UEFI on one of servers 110 and 120, to update other firmware of the servers, to detect device failures or indications of impending failures of the servers or devices, or the like. In a particular embodiment, more than one lifecycle console is instantiated in data center 100. For example, in the case where data center 100 serves separate and distinct customers, with dedicated server, each customer can have a separate lifecycle console. In another embodiment, one or more of server 110 and 120 can be managed by multiple lifecycle consoles, as needed or desired.

Consoles 142, 144, 146, and 148 each represent one or more information handling system, including the associated hardware and software to implement the functions and features of the consoles as describe above. In a particular embodiment, one or more of consoles 142, 144, 146, and 148 are instantiated on separate information handling systems of data center 100 that are dedicated to the management functions and features of management system 140. In another embodiment, one or more of consoles 142, 144, 146, and 148 are instantiated on one of servers 110 and 120, or on a virtual machine instantiated on the servers. It will be understood that consoles 142, 144, 146, and 148 are representative of the functions and features that can be employed in a full data center infrastructure management scheme, and are not meant to be inclusive of all the functions and features. In particular, management system 140 can also include consoles for energy management, asset management, availability management, risk management, service management, supply chain management, IT automation, or other management functions of a data center, as needed or desired.

Management controller 112 includes a console table 115, and management controller 122 includes a console table 125. Console tables 115 and 125 represent information derived at, or provided to, respective management controllers 112 and 122 from one or more of consoles 142, 144, 146, and 148. In particular, the information included in console tables 115 and 125 represent a current state or binding of the various consoles 142, 144, 146, or 148, with the respective management controllers 112 and 122. For example, console table 115 can include information as to whether or not server 110 is managed by one or more of consoles 142, 144, 146, and 148, or, where there are multiple consoles of each type, which console is provided to manage the server. In a particular embodiment, servers 110 and 120 operate to passively populate respective consoles 115 and 125. Here, when one of consoles 142, 144, 146, and 148 accesses management controller 112, the management controller determines what type of console is accessing the management controller, and an associated address, and populates console table 115 with the console type and address information. In another embodiment, consoles 142, 144, 146, and 148 operate to actively populate console tables 115 and 125. Here, consoles 142, 144, 146, and 148 are assigned to manage a particular element of one or more of servers 110 and 120, and, upon determining that a particular console is assigned to manage a particular server, the console writes an entry to the server's console table. The entry can include an identity of the console and console type, an address associated with the console, and authentication credentials that can used to access the console.

Figure 2:
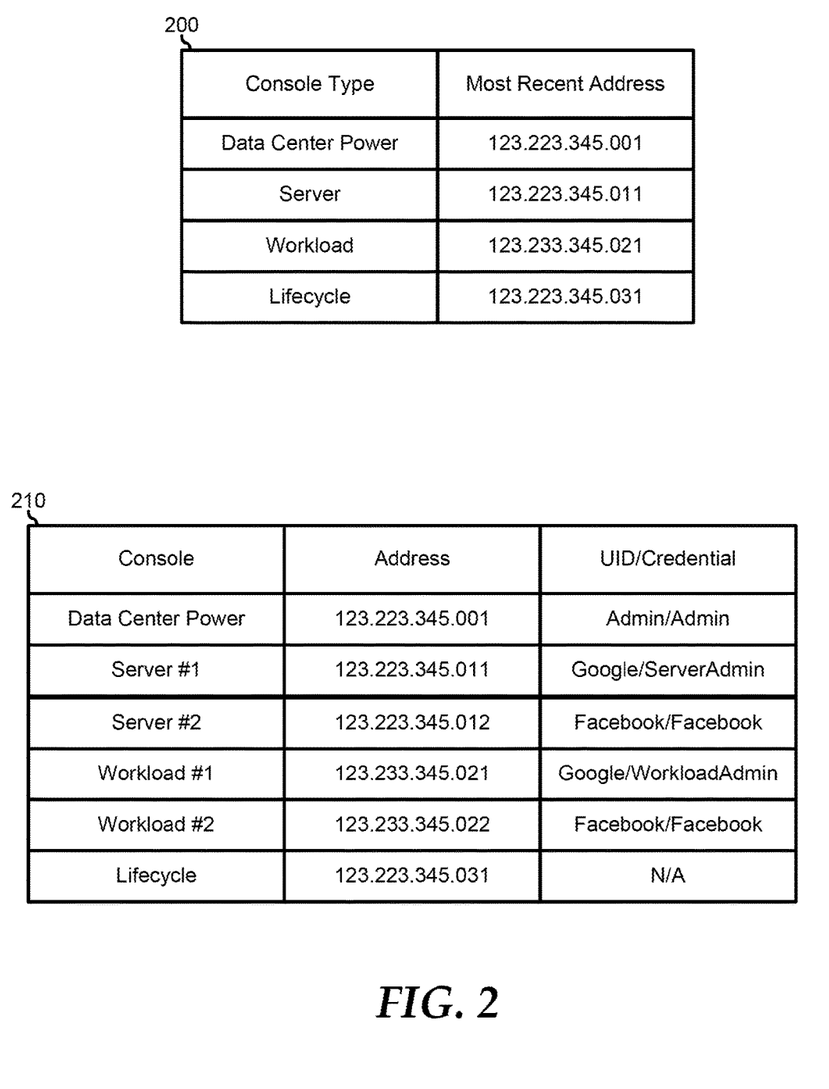
FIG. 2 illustrates various embodiments of a console table in a server of the data center of FIG. 1.

FIG. 2 illustrates various embodiments of console tables 200 and 210. Console table 200 represents a passively populated console table. Here, console table 200 can include entries for the various console types in a "console type" field. Then, when a particular console of the entry type access the management controller, the management controller places the address of the console in a "most recent address" field that is associated with the "console type." At a later time, if a different console of a particular type access the management controller, the management controller replaces the existing entry with the address of the different console in the "most recent address" field.

Console table 210 represents an actively populated console table. Here, console table 210 is initially empty, but has fields for "console," "address," and "UID/credential." When a management system recognized that a server is connected to the management network, the various consoles that are assigned to manage elements of the server write associated entries into console table 210. For example, a data center power management console can write an entry to console table 210 that includes the console name (Data Center Power), the address of the console (123.223.345.001), and login credentials, including a user identification (UID) and an associated password (Admin/Admin). In this way, where a particular server is managed by multiple consoles, each console writes its own entry to console table 210. For example, where the server provides data processing, storage, and distribution for several different customers, a server management console associated with each customer can manage elements of the server, and can each write an entry to console table 210. Thus, as illustrated, a first server management console can write an entry to console table 210 that includes the console name (Server #1), the address of the console (123.223.345.011), and login credentials (Google/ServerAdmin), and a second server management console can write a second entry to the console table that includes the console name (Server #2), the address of the console (123.223.345.012), and login credentials (Facebook/Facebook).

Returning to FIG. 1, mobile management device 150 operates to provide the user of the mobile management device with an operating interface that permits the user to interact with and manipulate the functions and features of management controllers 112 and 122. For example, mobile management device 150 can connect to management controller 112 via a connection established between either wireless interface s 113 and 153, or USB interface 114 and 154, and the user of the mobile management device can access the monitoring and management functions of the management controller. Additionally, the operating interface of mobile management device 150 permits the user to access the functions and features of management system 140. To this end, mobile management device 150 includes a console table 155, similar to console tables 115 and 125. Here, when mobile management device 150 establishes a connection with one of management controllers 115 and 125, the particular management controller provides the information included in its console table 115 or 125 to the mobile management device, and the mobile management device populates console table 155 with the information from the particular management controller.

Where the information in console tables 115 and 125 are passively populated, mobile management device 150 uses the addresses associated with each console type to address communications through the particular management controller 115 or 125, through management network 130, and to the associated console 142, 144, 146, or 148. Here, the security of the connection between mobile management device 150 and management system 140 is provided based upon the fact that the wireless connection between the mobile management device and the particular management controller 112 or 122 is an authenticated wireless connection, as described above, or based upon the fact that the USB connection guarantees that the user and the mobile management device are proximate to the particular server 110 or 120.

Where the information in console tables 115 and 125 are actively populated, mobile management device 150 uses the addresses associated with each console to address communications through the particular management controller 115 or 125, through management network 130, and to the associated console 142, 144, 146, or 148, and uses the supplied UID/credential to authenticate onto the associated console. Here, in addition to the wireless connection security or the USB interface security, the security of the connection between mobile management device 150 and management system 140 is also provided based upon the authentication between the mobile management device and the associated console.

In a particular embodiment, the UID/credential information provided to console tables 115 and 125 by one or more of consoles 142, 144, 146, and 148 relates to a limited access level to the functions and features of the consoles. In this way, where the user of mobile management device 150 is a technician, or is not an administrator, the level of access provided to the user can be limited to a subset of the functions and feature of the associated console 142, 144, 146, or 148. In another embodiment, one or more of consoles 142, 144, 146, and 148 provides multiple entries into console tables 115 and 125, where each entry includes different UID/credential information. Here, management controllers 112 and 122 operate to determine an authentication level for the user of mobile management device 150 based upon credentials provided when the wireless connection is established, or based upon a separate authentication activity between the management controllers and the mobile management device. In either case, once the authentication level is established between management controller 112 or 122 and mobile management device 150, the management controller provides the UID/credential information that is associated with the established authentication level to the mobile management device. In this way, the user of mobile management device 150 can be provided with varying levels of access to the functions and features of management system 140, based upon the UID/credential information that is provided to the mobile management device.

In a particular embodiment, mobile management device 150 includes one or more application program interface (API) that is associated with one or more console 142, 144, 146, and 148, and that provides the mobile management device 150 with appropriate management and control options to enable the user of the mobile management device to access the functions and features of the associated consoles. In another embodiment, when mobile management device 150 first access one of consoles 142, 144, 146, and 148, the accessed console provides an associated API to the mobile management device.

In another embodiment, an API associated with one or more of consoles 142, 144, 146, and 148 aggregates the functions and features of the consoles into a reduced number of user selectable options. For example, when a technician is directed to make a repair on a server, the user can establish a connection between mobile management device 150 and the management controller on the server and authenticate onto one or more of consoles 142, 144, 146, and 148. Here, the technician can be presented with an option to shut down the server. Then, after making the desired repairs to the server, the user can be present with an option to launch a workload on the server. In this instance, the single option to launch the workload can mask several individual interactions between mobile management device 150 and consoles 142, 144, 146, and 148. For example the option to launch the workload can include a direction to power console 142 to power up the server, a direction to server console 144 to launch a hypervisor on the server and to instantiate a virtual machine, and a direction to workload console 146 to load the particular workload onto the virtual machine.

In a particular embodiment, mobile management device 150 operates to receive the console table information from one of console tables 115 or 125. Here, the UID/credential information for one or more of consoles 142, 144, 146, and 148 includes authentication credentials for accessing a wireless communication interface associated with management system 140 (not shown). Here, after receiving the console table information, mobile management system 150 disconnects the connection to the one of management controllers 112 and 122, and then, using the authentication credentials for the wireless communication interface associated with management system 140, the mobile management device establishes a wireless connection with the wireless communication interface to interact with more directly with consoles 142, 144, 146, and 148. In this way, the management traffic through management network 130 can be reduced. In another embodiment, one or more of consoles 142, 144, 146, and 148 retrieves the console table information from one or more of console tables 115 and 125. Here, the consoles can learn of other similar types of consoles that are also being utilized to manage servers 110 and 120, for example, to better coordinate resource allocation between the servers.

Figure 3:
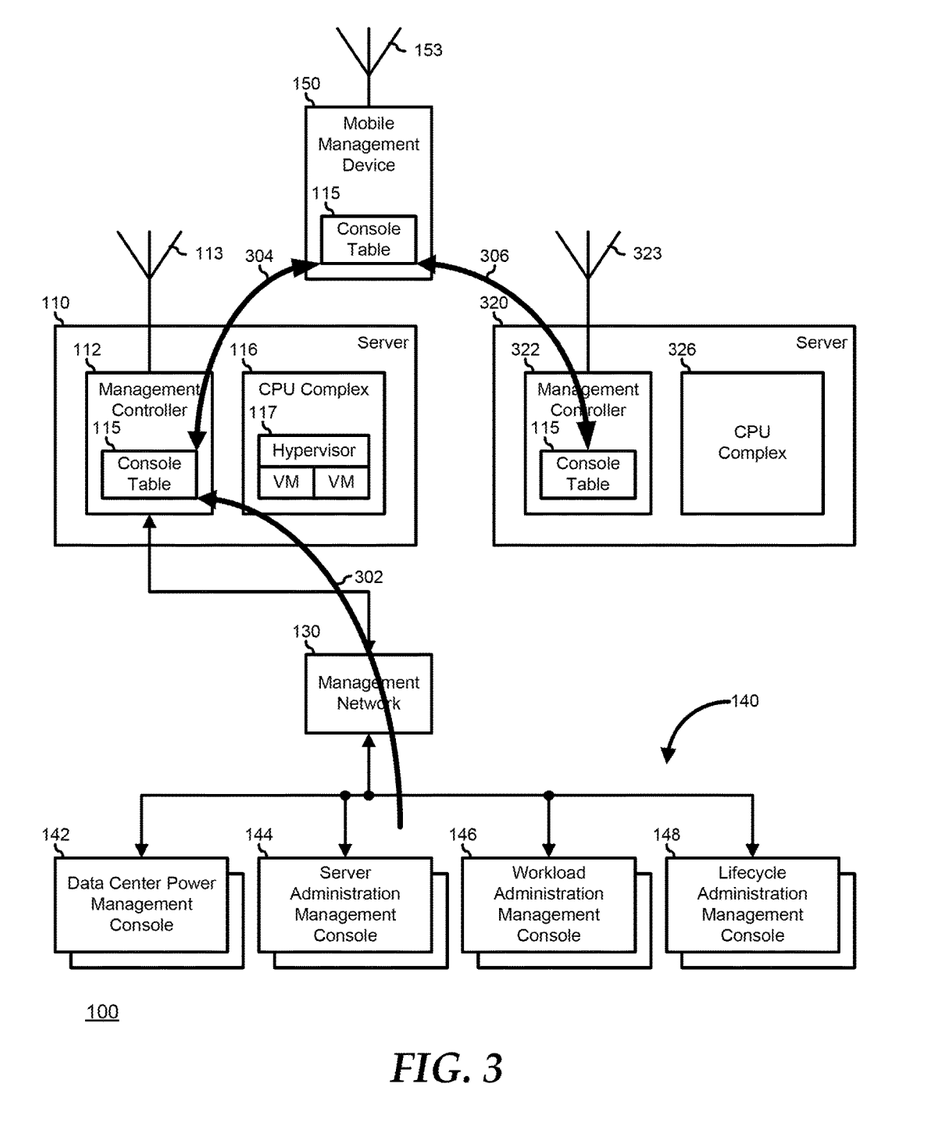
FIG. 3 illustrates a method of provisioning a server in the data center of FIG. 1.

FIG. 3 illustrates data center 100 and a method of provisioning a new server 320 in the data center. New server 320 is similar to servers 110 and 120, and includes a management controller 322 and a CPU complex 326. Here, in a first step 302, management controller 112 populates console table 115 with console table information from one or more of consoles 142, 144, 146, and 148. In a next step 304, mobile management device 150 retrieves the console table information from console table 115. In a next step 306, mobile management device 150 establishes a connection to management controller 322 and the management controller populates a console table with the information from console table 115. In this way, a technician can easily provision management controller 322, and the management controller can access consoles 142, 144, 146, and 148, as needed or desired.

Figure 4:
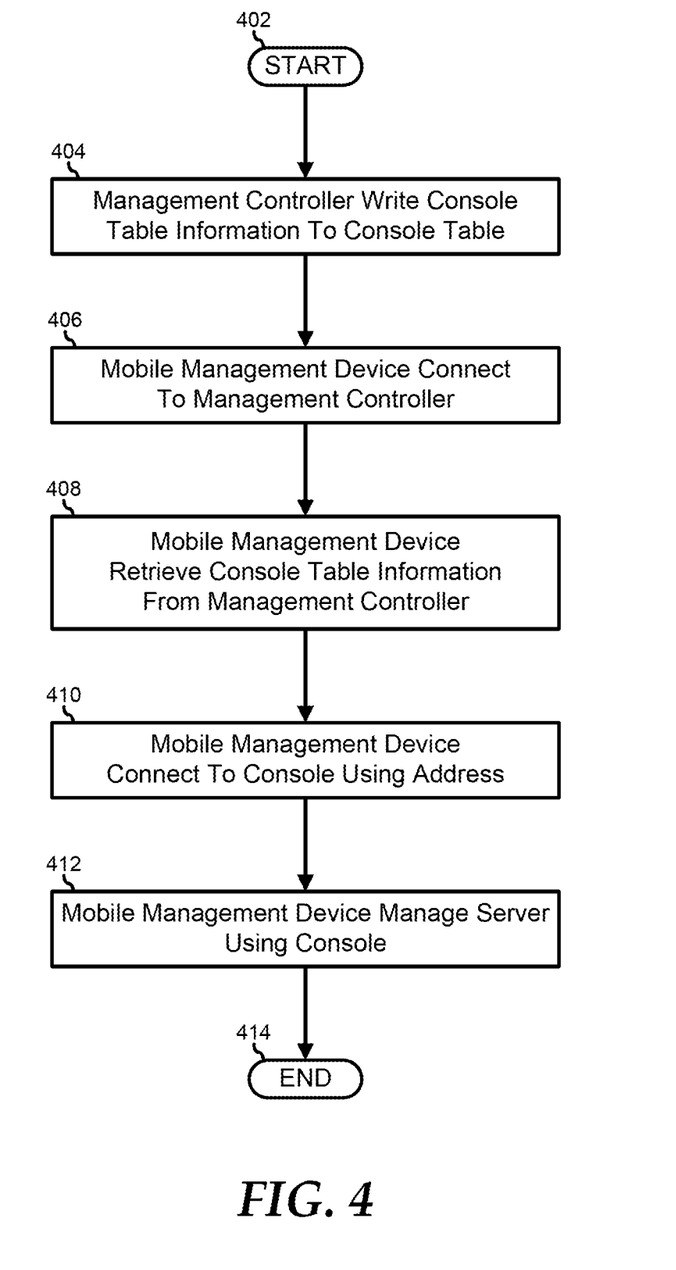
FIG. 4 is a flowchart illustrating a method for providing management network communication and control in a data center according to an embodiment of the present disclosure.

FIG. 4 illustrates a method for providing management network communication and control in a data center, starting at block 402. A management controller writes console table information to a console table in block 404. For example, management controller 112 can passively populate consoles 115, such that when one of consoles 142, 144, 146, and 148 accesses the management controller, the management controller determines what type of console is accessing the management controller, and the associated address, and populates the console table with the console type and address information. In another example, consoles 142, 144, 146, and 148 can actively populate console tables 115 and 125.

A mobile management device connects to the management controller in block 406. For example, mobile management device 150 can form a wireless connection with management controller 112 via wireless interfaces 113 and 153, or the mobile management device can form a wired connection with the management controller via USB interfaces 114 and 154. The mobile management device retrieves the console table information from the console table in the management controller in block 408. Here, management controller 112 can provide the console table information from console table 115 to mobile management device 150, and the mobile management device can populate console table 155 with the received console table information.

The mobile management device connects to a console using the address to the console provided in the console table information in block 410. Here, mobile management device 150 can access one or more of consoles 142, 144, 146, and 148 based upon the console addresses provided by console table 155. In addition, where the console table information includes UID/credential information, mobile management device 150 can use the UID/credential information to log on to one or more of consoles 142, 144, 146, and 148. The mobile management device manages the server using the connected console in block 412 and the method ends in block 414. For example, mobile management device 150 can be provided with an API that permits a user of the mobile management device to access the functions and features of one or more of consoles 142, 144, 146, and 148 to manage server 112.

Figure 5:
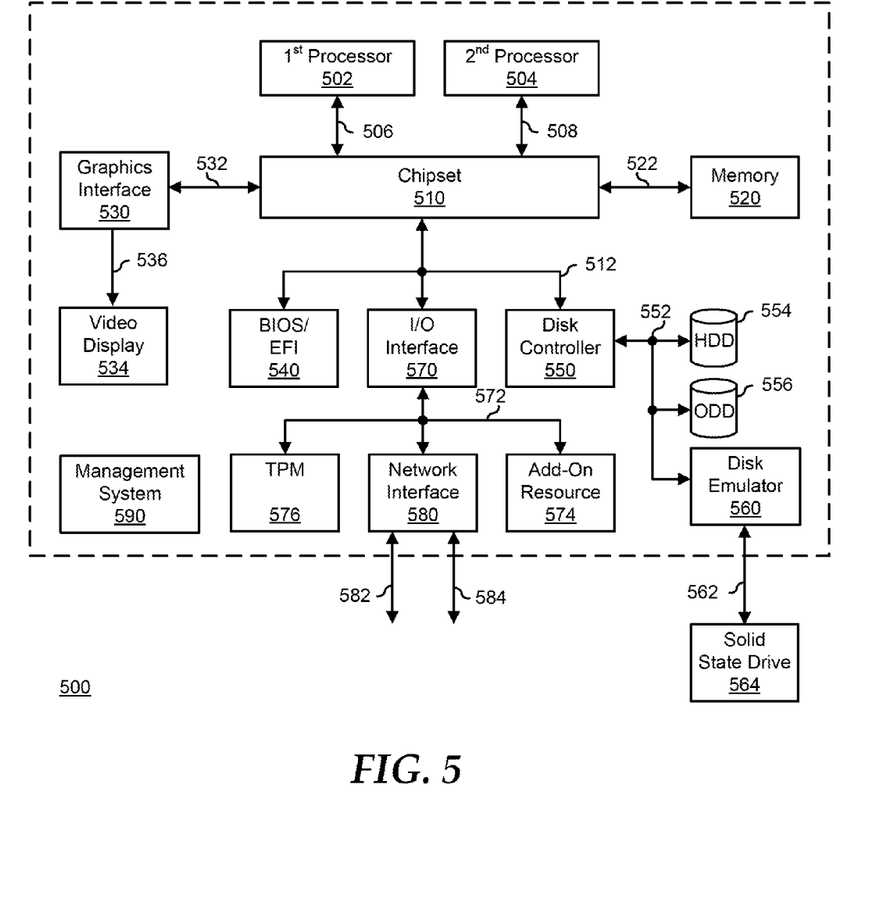
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, a network interface 580, and a management system 590. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management system 590 provides for out-of-band monitoring, management, and control of the respective elements of information handling system 500, such as cooling fan speed control, power supply management, hot-swap and hot-plug management, firmware management and update management for system BIOS or UEFI, Option ROM, device firmware, and the like, or other system management and control functions as needed or desired. As such, management system 590 provides some or all of the functions and features of the management systems, management controllers, embedded controllers, or other embedded devices or systems, as described herein.

Figure 6:
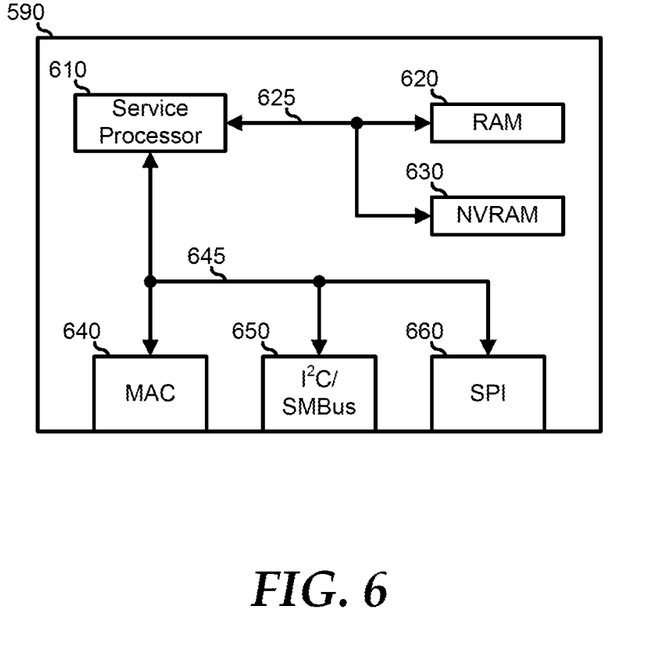
FIG. 6 is a block diagram illustrating an embodiment of a management system of the information handling system of FIG. 5.

FIG. 6 illustrates an embodiment of management system 590, including a service processor 610, a random-access memory (RAM) 620, an NVRAM 630, a media access control interface (MAC) 640, an I$^2$C/SMBus interface 650, and an SPI interface 660. RAM 620 and NVRAM 630 are connected to service processor 610 through a memory bus 625. MAC 640, I$^2$C/SMBus interface 650, and SPI interface 660 are connected to service processor 610 through an I/O bus 645. Management system 590 functions as a separate microcontroller system in information handling system 500, providing a dedicated management channel for maintenance and control of resources in the information handling system. As such, the resources in information handling system 500 are connected to one or more of I$^2$C/SMBus interface 650, and SPI interface 660, permitting management system 590 to receive information from or send information to the resources. A management system can be connected to management system 590 via MAC 640, thereby permitting the management system to receive information from or send information to the management system for out-of-band management of information handling system 500. An example of MAC 640 includes an Ethernet standard interface, such as a reduced media independent interface (RMII), a network communication service interface (NC-SI), another network standard interface, or any combination thereof.

In a particular embodiment, management system 590 is included on a main circuit board (such as a baseboard, a motherboard, or any combination thereof) of information handling system 500, integrated onto another element of the information handling system such as chipset 510, or another suitable element, as needed or desired. As such, management system 590 can be part of an integrated circuit or a chip set within information handling system 500. An example of management system 590 includes a baseboard management controller (BMC), an integrated Dell remote access controller (iDRAC), another controller, or any combination thereof. Management system 590 can also operate on a separate power plane from other resources in information handling system 500. Thus management system 590 can communicate with a management system while the resources of information handling system 500 are powered off. Here, information can be sent from the management system to management system 590 and the information is stored in RAM 620 or NVRAM 630. Information stored in RAM 620 may be lost after power-down of the power plane for management system 590, while information stored in NVRAM 630 may be saved through a power-down/power-up cycle of the power plane for the management controller.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. An information handling system, comprising:
a host processing complex to instantiate a hosted processing environment;
a first managed element; and
a baseboard management controller to manage the managed element out of band from the hosted processing environment, wherein the baseboard management controller:
stores console information for a plurality of management consoles, wherein the console information includes a mapping to each of the management consoles, and wherein a first one of the management consoles directs the baseboard management controller to manage the first managed element;
provides the console information to a mobile management device;
receives a first direction from the mobile management device based upon the console information in response to providing the console information to the mobile management device;
provides the first direction to the first management console;
receives first management information from the first management console to direct the baseboard management controller to manage the first managed element based upon the first management information; and
stores the console information in an entry of a console table.

2. The information handling system of claim 1, wherein the entry includes an identity for each of the management consoles and an address for each of the management consoles.

3. The information handling system of claim 1, wherein the baseboard management controller stores the management console information in response to an access by the first management console to the baseboard management controller.

4. The information handling system of claim 3, wherein the baseboard management controller:
determines an address of the first management console based upon the access; and stores the address in the entry.

5. The information handling system of claim 1, wherein the baseboard management controller receives the console information from the first management console, and wherein the console information further includes an authentication credential associated with the first management console.

6. The information handling system of claim 5, wherein the baseboard management controller:
receives an instruction from the mobile management device, wherein the instruction includes the authentication credential;
provides the instruction to the first management console, wherein the mobile management device is logged on to the first management console based upon the authentication credential; and
receives the first management information in response to the mobile management device being logged on to the first management console.

7. A method, comprising:
storing, by a baseboard management controller of an information handling system, console information associated with a first one of a plurality of management consoles in an entry of a console table of the baseboard management controller, wherein the first management console directs the baseboard management controller to manage a managed element of the information handling system out of band from a hosted processing environment instantiated on a host processing complex of the information handling system;
providing the console information to a mobile management device;
receiving, by the baseboard management controller, direction from the mobile management device based upon the console information in response to providing the console information to the mobile management device;
providing the direction to the first management console; and
receiving, by the baseboard management controller, management information from the first management console to direct the baseboard management controller to manage the managed element based upon the management information.

8. The method of claim 7, wherein the entry includes an identity of the first management console and an address of the first management console.

9. The method of claim 7, further comprising:
storing, by the management controller, the console information in response to an access by the first management console to the baseboard management controller.

10. The method of claim 9, further comprising:
determining an address of the first management console based upon the access; and
storing the address in the entry.

11. The method of claim 7, further comprising:
receiving, by the baseboard management controller, the console information from the first management console.

12. The method of claim 11, wherein the console information further includes an authentication credential associated with the first management console.

13. The method of claim 12, further comprising:
receiving an instruction from the mobile management device, wherein the instruction includes the authentication credential;
providing the instruction to the first management console, wherein the mobile management device is logged on to the first management console based upon the authentication credential; and
receiving a direction to manage the managed device from the first management console in response to the mobile management device being logged on to the first management console.

14. A non-transitory computer-readable medium including code for performing a method, the method comprising:
storing console information associated with a first one of a plurality of management consoles in an entry of a console table of a baseboard management controller, wherein the first management console directs the baseboard management controller to manage a managed element of an information handling system out of band from a hosted processing environment instantiated on a host processing complex of the information handling system; and
providing the console information to a mobile management device;
receiving, by the baseboard management controller, direction from the mobile management device based upon the console information in response to providing the console information to the mobile management device;
providing the direction to the first management console; and receiving, by the baseboard management controller, management information from the first management console to direct the baseboard management controller to manage the managed element based upon the management information.

15. The computer-readable medium of claim 14, wherein the entry includes an identity of the first management console and an address of the first management console, the method further comprising:
storing, by the management controller, the management console information in response to an access by the first management console to the baseboard management controller.

16. The computer-readable medium of claim 15, the method further comprising:
determining an address of the first management console based upon the access; and
storing the address in the entry.

17. The computer-readable medium of claim 14, wherein the console information further includes an authentication credential associated with the first management console, the method further comprising:
receiving, by the baseboard management controller, the console information from the first management console.

18. The computer-readable medium of claim 17, further comprising:
receiving an instruction from the mobile management device, wherein the instruction includes the authentication credential;
providing the instruction to the management console, wherein the mobile management device is logged on to the first management console based upon the authentication credential; and
receiving a direction to manage the managed device from the first management console in response to the mobile management device being logged on to the first management console.

19. The information handling system of claim 1, further comprising:
a second managed element, wherein a second one of the management consoles directs the baseboard management controller to manage the second managed element;
wherein the baseboard management controller:
receives a second direction from the mobile management device based upon the console information in response to providing the console information to the mobile management device;
provides the second direction to the second management console; and
receives second management information from the second management console to direct the baseboard management controller to manage the second managed element based upon the second management information.

* * * * *